(12) United States Patent
Winzell et al.

(10) Patent No.: US 11,165,965 B2
(45) Date of Patent: Nov. 2, 2021

(54) METHOD FOR ASSISTING CAMERA TILT ANGLE ADJUSTMENT

(71) Applicant: Axis AB, Lund (SE)

(72) Inventors: Thomas Winzell, Lund (SE); Hongping Zhao, Lund (SE); Anthony Hawkins, Lund (SE)

(73) Assignee: AXIS AB, Lund (SE)

( * ) Notice: Subject to any disclaimer, the term of this patent is extended or adjusted under 35 U.S.C. 154(b) by 146 days.

(21) Appl. No.: 16/709,407

(22) Filed: Dec. 10, 2019

(65) Prior Publication Data
US 2020/0195854 A1 Jun. 18, 2020

(30) Foreign Application Priority Data

Dec. 12, 2018 (EP) .................................. 18211810

(51) Int. Cl.
*H04N 5/232* (2006.01)
*H04N 7/18* (2006.01)

(52) U.S. Cl.
CPC ..... *H04N 5/23299* (2018.08); *H04N 5/23229* (2013.01); *H04N 7/18* (2013.01)

(58) Field of Classification Search
None
See application file for complete search history.

(56) References Cited

U.S. PATENT DOCUMENTS

| | | | | |
|---|---|---|---|---|
| 2010/0231713 A1* | 9/2010 | Oyabu | ................... | H04N 7/183 348/143 |
| 2011/0243546 A1* | 10/2011 | Pace | ................. | H04N 5/23299 396/428 |
| 2011/0268433 A1* | 11/2011 | Yim | ................... | H04N 5/23299 396/427 |
| 2012/0147181 A1 | 6/2012 | Duner | | |
| 2013/0242086 A1* | 9/2013 | Brueckner | .............. | G06T 7/571 348/135 |
| 2014/0118495 A1* | 5/2014 | Coombe | ................. | G06T 17/05 348/46 |
| 2014/0253783 A1* | 9/2014 | Springer | ............ | H04N 5/23216 348/347 |
| 2015/0116577 A1* | 4/2015 | Lin | .......................... | G02B 7/38 348/345 |

(Continued)

FOREIGN PATENT DOCUMENTS

| | | |
|---|---|---|
| JP | 2004-312098 A | 11/2004 |
| JP | 2015-050693 A | 3/2015 |
| JP | 2016-201611 A | 12/2016 |

*Primary Examiner* — Stefan Gadomski

(74) *Attorney, Agent, or Firm* — Volpe Koenig

(57) ABSTRACT

A method of assisting tilt angle adjustment of a thermal camera comprises arranging the thermal camera at an initial tilt angle, acquiring at least one thermal image by the thermal camera, determining, from the at least one thermal image, a series of sharpness indicators of image parts corresponding to vertically spaced parts of the camera view, identifying a maximum in the series of sharpness indicators, based on the identified maximum, determining a target sharpness indicator as a predetermined fraction of the identified maximum, during tilt angle adjustment, assisting by providing a target signal for indicating a target tilt angle of the thermal camera in which a sharpness indicator of a lower part of the camera's field of view equals the determined target sharpness indicator.

16 Claims, 5 Drawing Sheets

(56) References Cited

U.S. PATENT DOCUMENTS

2015/0304532 A1* 10/2015 Bart ................... H04N 5/2252
348/373
2018/0332236 A1* 11/2018 Glaser ................. H04N 5/2257

* cited by examiner

METHOD FOR ASSISTING CAMERA TILT ANGLE ADJUSTMENT

TECHNICAL FIELD

The present invention relates to the field of positioning of a thermal camera, in particular positioning by adjusting a tilt angle.

BACKGROUND

In the art of image capturing, depth of field (DoF) is an important factor to consider. The DoF in a field of view (FoV) of a camera is defined as the distance between the closest and farthest objects in the image that are imaged with an acceptable sharpness. In other words, the DoF describes the area that is in focus in a captured image. The DoF depends on different factors, for example camera optics (aperture, sensor size) and the focus point.

For a monitoring camera application, a large DoF in captured images is often of interest to be able to, e.g., detect, and possibly even identify, objects in a scene that is monitored. Hence, a monitoring camera with a suitable configuration (in optics and focus point) should be selected based on the specific monitoring application to enable a desirable DoF. In order to make full use of the available DoF, a position of the monitoring camera is also a parameter to consider. In particular, how the camera is positioned in a tilt direction is important.

Consequently, positioning, and in particular included tilt angle adjustment (i.e. adjustment of FoV in a vertical direction) of a monitoring camera, must be made carefully. It is often a time-consuming process to fine tune the position in order to make full use of the available DoF. In an optimal scenario, the installer has no time strain and can adjust camera position while viewing acquired images, on, e.g., a laptop or another mobile device. However, surveillance installations are most often not that simple. Elevated mounting, e.g. on a pole, or mounting in narrow spaces make it difficult to, in a secure manner, look at a laptop while adjusting the camera. This is often combined with a limited amount of time for the mounting and installation. For example, when mounting cameras in connection to a railway system, train traffic has to be temporarily stopped during the mounting. It is of course of great importance to keep the stop as short as possible.

Therefore, there exists a need for solutions to assist and simplify the mounting process for a camera, and to contribute to minimizing the time required for mounting and installation of cameras. The need is particularly great for fixed monitoring cameras.

SUMMARY

Providing a method for assisting and aiding during mounting of a monitoring camera that is intended to monitor a scene at an angle from an elevated position would be beneficial. For these types of monitoring cameras, particular care should be taken during tilt adjustment, while the mounting process is often complicated and limited by time.

According to a first aspect, a method of assisting tilt angle adjustment of a thermal camera that is tiltably mounted for monitoring a scene at an angle from an elevated position, comprises:
arranging the thermal camera at an initial tilt angle,
acquiring at least one thermal image by the thermal camera,
determining, from the at least one thermal image, a series of sharpness indicators of image parts corresponding to vertically spaced parts of the camera view,
identifying a maximum in the series of sharpness indicators,
based on the identified maximum, determining a target sharpness indicator as a predetermined fraction of the identified maximum, and
during tilt angle adjustment, assisting by providing a target signal for indicating a target tilt angle of the thermal camera in which a sharpness indicator of a lower part of the camera's field of view (FoV) equals the determined target sharpness indicator.

The embodiments provide assistance for a user when mounting a thermal camera for monitoring a scene from an elevated position (i.e. from a high angle). An optics-specific relationship between the sharpness of an image part and the distance between the camera and imaged part of the scene may be utilized for assisting in the tilt angle adjustment. More specifically, this relationship utilizes that the sharpness increases with increasing distance from a near limit (e.g. the hyperfocal near limit) of the camera until reaching a maximum sharpness at the focus distance. Beyond the focus distance, the sharpness decreases. This is a general characteristic of the optics-specific relationship that is valid independent of focus distance and type of optics (e.g. aperture or sensor size). By acquiring the series of sharpness indicators, the maximum can be identified which provides a reference for the tilt angling. The target tilt angle is defined as the tilt angle for which a lower part of the image has a target sharpness indicator corresponding to a predetermined fraction of the maximum sharpness. The predetermined fraction is set on beforehand and depends on, e.g., the focus distance and the optics.

Going more into detail, the maximum is identified by acquiring the series of sharpness indicators in different image parts of the camera view. The image parts may be in the same FoV, i.e. be determined from a single acquired thermal image, or be in different fields of view, i.e. be determined from a plurality of thermal images that are acquired at different tilt angles for the camera. When the maximum has been identified, the predetermined fraction of that maximum is set as the target sharpness indicator. The fraction may be selected based on different factors. One factor is to make full use of the available DoF (which in turn depends on, e.g., optics and focus distance) Other circumstances may be considered when determining the fraction. For example, it may be beneficial to minimize the amount of sky present in the FoV. Therefore, the fraction may be selected to increase the chance of including as much landscape area as possible in the FoV, even though it does not affect the utilization of the available DoF (or even lower the utilization). Hence, the fraction may be predetermined considering a number of different optics-specific, scene-specific, and/or application-specific factors.

As will be evident from the following description herein, the target signal may be provided in a number of different ways. Non-limiting examples will be provided in embodiments.

It is also noted that by equal is meant, in this context, in the area of or-similar to and is not restricted to the meaning having the exact same value as.

As used herein "elevated position" means that the camera is positioned above the level of objects to be monitored. In other words, the camera is mounted to view the scene from a high angle, contrary to eye-level or low angle. Consequently, captured images will have a high angle view of the scene. The height at which the camera is positioned can span from just above the height of the object up to a height at which it stops being meaningful to capture images (due to limitations in image quality, area of interest, etc.). A selection of height is application specific and depends on the scene to be monitored. When monitoring a train track, e.g., the camera may be positioned at about 7-10 meters that is suitable for most train heights. When monitoring a part of a city, such as an intersection, the camera typically needs to be positioned higher, e.g. 20 meters up, to cover the whole area of interest. For perimeter surveillance, a camera is typically placed 3-10 meter above the ground.

A single thermal image may be acquired. This embodiment provides a simple method with no need for tilting. The method complements the skills of an experienced installer who can make a rough tilt adjustment and assists in a fine adjustment of the tilt angle. In that way, a time-efficient mounting suitable for a skilled installer may be achieved.

In one embodiment, the method further comprises:
evaluating if it is possible to identify the maximum from the series of sharpness indicator determined based on the single thermal image, and
upon concluding that it is possible, identifying the maximum and determining the target sharpness indicator based on the identified maximum,
upon concluding that it is not possible,
acquiring further thermal images for which the thermal camera is arranged in different tilt angles,
determining, from the further thermal images, further sharpness indicators of image parts corresponding to vertically spaced parts of the camera view, and add the further sharpness indicators to the series of sharpness indicators, and
identifying the maximum and determining the target sharpness indicator based on the identified maximum.

This embodiment provides an efficient method that is flexible to use. The monitoring camera can be set in any initial tilt position. With a good initial position, the tilt angle adjustment may be assisted based on a single thermal image. With a not so good initial tilt position, tilt adjustment is needed during the assistance.

In one embodiment, a plurality of thermal images is acquired for which the thermal camera is arranged in different tilt angles at which a different thermal image is acquired. Further, the series of sharpness indicators is determined from the plurality of the acquired thermal images. This embodiment provides a time-efficient method where multiple thermal images are acquired directly.

Optionally, for any above disclosed embodiment, an instruction signal to a user for indicating that the tilt angle of the thermal camera should be changed for enabling acquisition of thermal images in different tilt angles. The instruction signal may be sent as, e.g., sound, light, or data. There are numerous options for guiding the user, e.g. a pulse frequency of a sound signal or light signal may be varied with a distance from the correct tilt angle in an intuitive manner.

The target signal may be provided to a user. In most cases today, tilt adjustment for thermal cameras is performed manually, and this embodiment aids such a procedure. An advantage by manual tilt angle adjustment is that the thermal camera does not require any motorization for this purpose. This enables a more simple and low-cost design of the thermal camera.

By providing a target signal to the user, the user gets a direct and intelligible indication that the camera is positioned in the target tilt angle. Moreover, the user does not need to bother determining the tilt angle on his own, the method of the thermal camera takes care of this for him/her. Hence, a time-efficient and user-friendly tilt angle adjustment is achieved.

The target signal may comprise a sound signal or a light signal that is provided to the user when the thermal camera is positioned in the target tilt angle. Both these types of signal are easy to perceive for the user.

The series of sharpness indicator may be determined based on a weighting. A weighting function may be applied to pixels in the image parts such that pixels located, as seen in a horizontal direction, in a center area have more impact than pixels located in peripheral areas. This embodiment is particularly beneficial for perimeter surveillance, where typically a center area in the horizontal direction forms the region of interest in the FoV. It has been realized that it is beneficial to weight up the center area against peripheral areas for the purpose of adjusting the tilt angle, since it is interesting to focus the optimization on how to make desired use of the available DoF to the image information in this area.

Each sharpness indicator may be determined by an algorithm based on edge detection, Laplace transform, or a modular transfer function. In particular, standard deviation of a Sobel filter, being a type of edge detection, applied to the image part has been proven to have high resistance to disturbing object in the scene. Any suitable algorithm for determining the sharpness indicator may be used, and the method is not limited to any particular one. Since the determination of the target sharpness indicator is based on relative characteristics of the series of sharpness indicators, and not on their absolute values, the method is not sensitive to how the sharpness indicators are measured as long as it is performed in the same manner throughout the method.

In an embodiment where the focus distance is set at the hyperfocal distance (being a well-known optics term), the predetermined fraction may be selected such that the determined target sharpness indicator corresponds to an acceptable sharpness at half the hyperfocal distance for the thermal camera optics. This provides an, in theory, optimal utilization of the available DoF. However, as mentioned above, the fraction may be determined based on other criteria as well, such as how the scene looks and on the specific monitoring application.

According to a further aspect, the method according to any embodiment is used in perimeter surveillance. Perimeter surveillance entails when a surveillance camera monitors a boundary in a scene. The boundary may form a boundary between public and private ground and the monitoring may be adapted for trespass prevention. For perimeter surveillance, the camera is directed, at least partly, along the boundary to be monitored. Hence, the boundary extends in a depth direction as seen from the camera. For this type of surveillance, it is beneficial to be able to provide tilt angle assistance to, in a desired manner, make full use of the available DoF.

According to a further aspect, the above and other aspects are achieved, in full or in part, by a thermal camera adapted to be tiltably mounted for monitoring a scene from an elevated position, the thermal camera comprising:
an image capturing unit arranged to acquire at least one thermal image,
a processing unit arranged to:
determine, from the at least one thermal image, a series of sharpness indicators of image parts corresponding to vertically spaced parts of the camera view, identify a maximum in the series of sharpness indicators, based on the identified maximum, determine a target sharpness indicator as a predetermined fraction of the identified maximum, and during tilt angle adjustment, assist by providing a target signal for indicating a target tilt angle of the thermal camera in which a sharpness indicator of a lower part of the camera's field of view (FoV) equals the determined target sharpness indicator.

The thermal camera of this further aspect may generally be embodied in the same ways as the method of the first aspect.

The thermal camera may further comprise a sound or light indicator arranged to provide the target signal in the form of a sound or light signal that is hearable or visible to a user. The processing unit may be arranged to instruct the sound or light indicator to transmit the target signal when the thermal camera is positioned in the target tilt angle. The light indicator is preferably placed at a front section of the camera to be easily viewed by the user. Alternatively, other means for providing the target signal may be used. For example, the target signal may be sent in the form of a data signal output from the thermal camera to for example a laptop which is used during the installation. More specifically, the data signal may be sent in association with a video stream output from the thermal camera. For example, the data signal (target signal) may be in the form of a graphical representation embedded in the video stream for easy perception by the user looking at the video stream while the camera is adjusted. This may be a preferred configuration in an installation scenario where the user may need to look at the video stream for other purposes, such as for checking image properties.

Alternatively, the thermal camera may further comprise a motor unit arranged to tilt the thermal camera. The processing unit may be further arranged to instruct the motor unit to tilt the thermal camera for acquiring a plurality of thermal images for which the thermal camera is arranged in different tilt angles. The motor unit may further aid the installation. The adjustment may be made remotely, i.e. an installer does not need to physically reach the monitoring camera to perform the tilting. The installer may be on the ground, or even farther away from the scene. A motor unit contributes to a more automatic procedure of adjusting the tilt angle.

The processing unit may be arranged to provide the target signal in the form of an instruction to the motor unit to stop tilting.

The thermal camera may be a fixed focus thermal camera. This means that the camera is configured, typically at manufacturing, to have a fixed focus distance. Usually, the focus distance is set around the hyperfocal distance for the camera optics. However, other fixed focus distances are possible.

A further scope of applicability will become apparent from the detailed description given below. However, it should be understood that the detailed description and specific examples, while indicating preferred embodiments, are given by way of illustration only, since various changes and modifications within the scope of the embodiments will become apparent to those skilled in the art from this detailed description.

Hence, it is to be understood that the embodiments are not limited to the particular component parts of the device described or steps of the methods described as such device and method may vary. It is also to be understood that the terminology used herein is for purpose of describing particular embodiments only, and is not intended to be limiting.

It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The embodiments will now be described in more detail by way of example and with reference to the accompanying schematic drawings, in which.

DETAILED DESCRIPTION OF EMBODIMENTS

Figure 1:
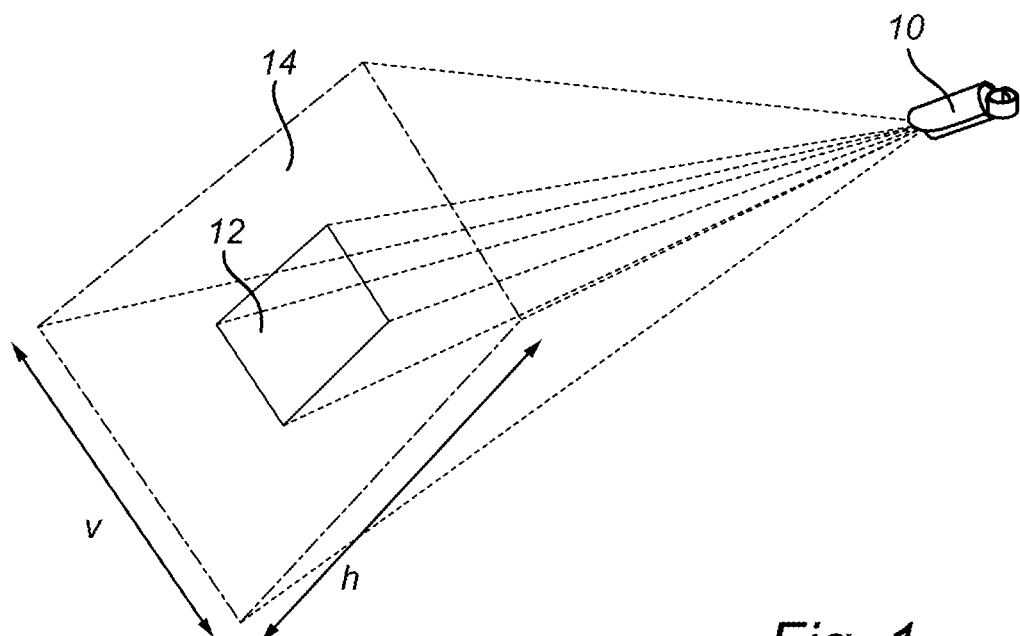
FIG. 1 illustrates views of a camera in a general case.

A camera 10 is illustrated in FIG. 1, together with a couple of views. The camera's 10 field of view, FoV, 12 is defined as the extent of a scene that is seen by the camera 10 at a given moment. On the other hand, a camera view 14 is defined as the potential FoV that the camera 10 can take. In other words, by panning (i.e. moving the FoV 12 in a horizontal direction h) and/or by tilting (i.e. moving the FoV 12 in a vertical direction v), the camera 10 can adjust its FoV 12 to reach anywhere within the camera view 14. The camera view 14 is thus defined by movement limits of the camera 10, i.e. by how much panning and tilting that the camera 10 is allowed to perform.

Figure 2:
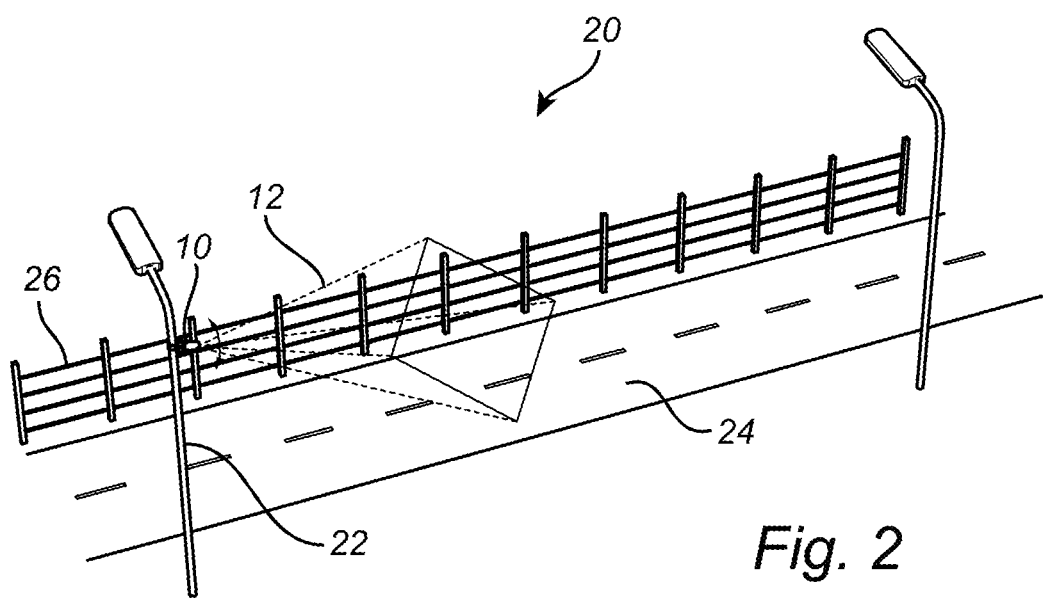
FIG. 2 illustrates a monitoring scenario with a thermal camera.

Having the above definitions in mind, FIG. 2 illustrates the camera 10 mounted on a lamppost 22 to monitor a scene 20. The scene 20 includes a roadway 24 and a fence 26 at the side of the roadway 24. The camera 10 is positioned to monitor the scene 20 at an angle from an elevated position. As discussed before, the camera 10 can be said to have a high-angle view and acquire high-angle thermal images. Camera tilt adjustment is particularly difficult for high-angle surveillance applications, such as the illustrated scenario, where the camera 10 monitors the scene 20 from a large distance. A reason for the complexity is that a small adjustment in tilt has a high impact on the FoV, i.e. on what part of the scene that is imaged. Fine adjustment of the tilt position of the camera 10 is thus required.

The camera 10 is a thermal camera. For a thermal camera, mounted in an elevated position, the tilt angle adjustment is even more complex, compared to cameras producing images based on visual light. Firstly, it is difficult to adjust the thermal camera based on feedback in the form of thermal images. This because thermal images are visually very different, compared to visual light images, to how a human brain images the scene. Secondly, thermal cameras are sensitive for fine tuning of the tilt angle by that a small adjustment of the tilt can have a large impact on the resulting shift of the FoV.

Figure 3:
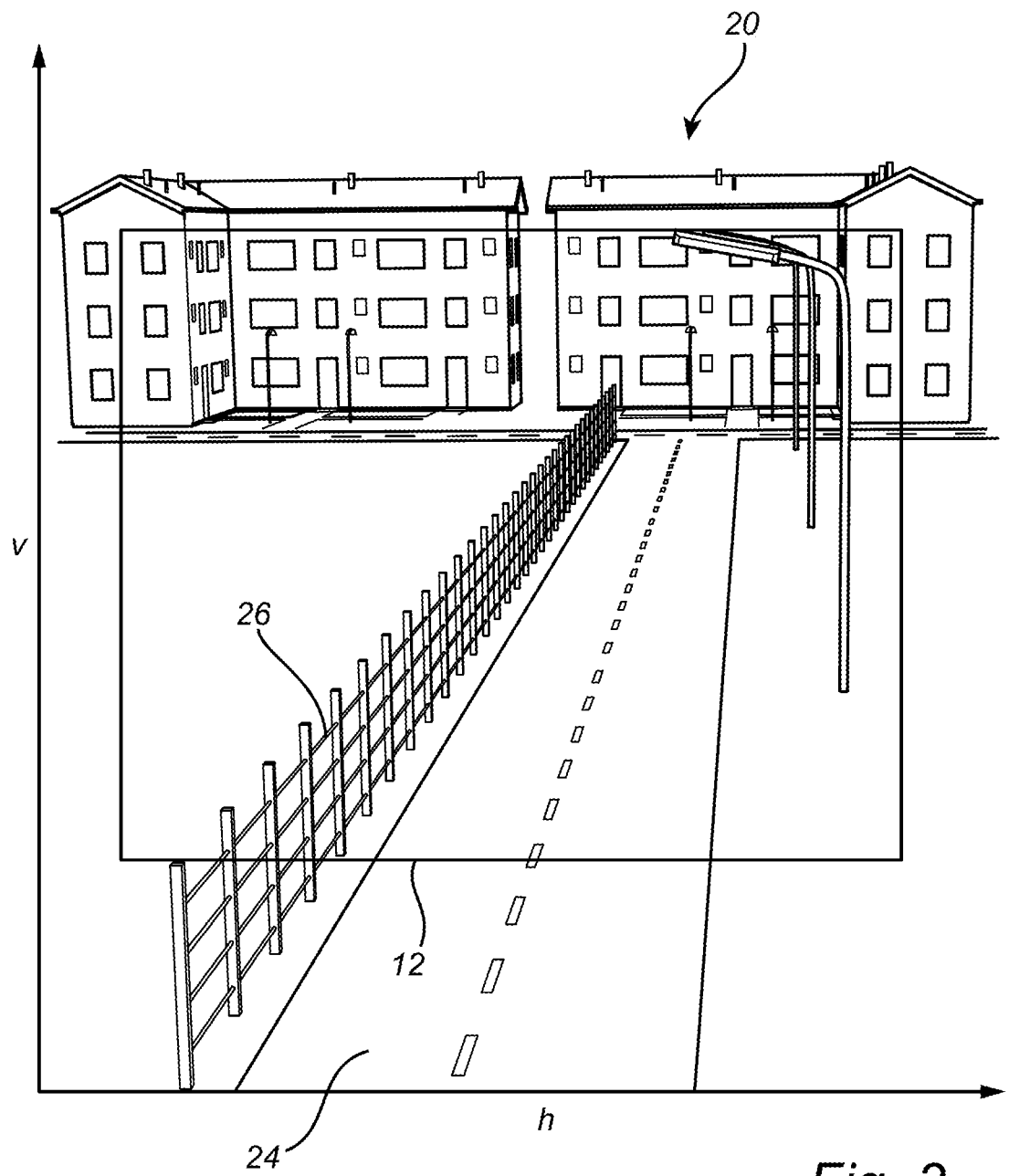
FIG. 3 illustrates the monitoring scenario from the thermal camera's point of view.

In addition, FIG. 3 illustrates the scene 20 from the camera's 10 point of view. In FIG. 3, the current FoV 12 is indicated. The surveillance scenario in this embodiment could be a perimeter surveillance of a boundary defined by the fence 26, where it is interesting to detect any (moving) object in an area of the fence 26.

Figure 4:
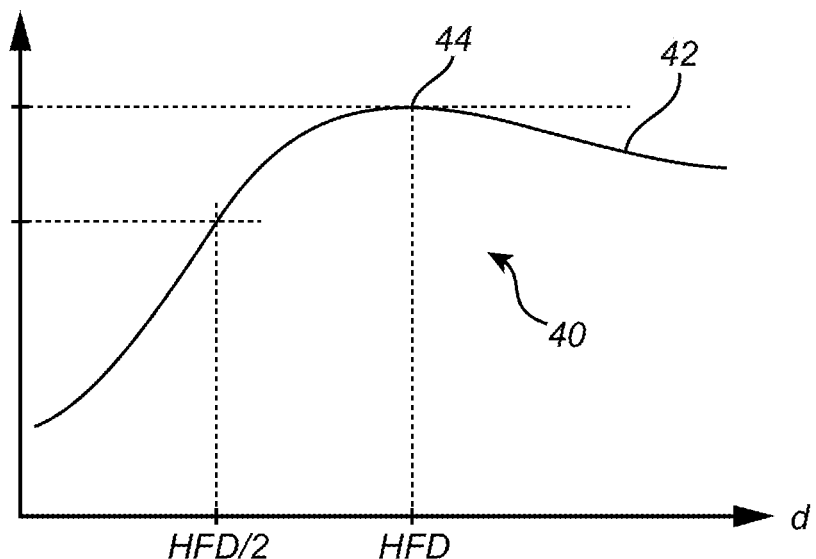
FIG. 4 illustrates an optics-specific relationship.

The embodiments are based on the realization that an optics-specific relationship 40, exemplified in FIG. 4, between sharpness S of an image part and the distanced d between the camera 10 and a corresponding imaged part of the scene 20, may be utilized for assisting in the tilt angle adjustment of the camera 10. FIG. 4 provides an example where the focus distance is set to the hyperfocal distance (HFD) for the camera optics. The HFD is a well-known optics term for the person skilled in the art. However, it is realized the focus distance may be set at other distances than HFD in other embodiments. The same principles and advantages are valid regardless of focus distance.

The optics-specific relationship has, in general, the same characteristics regardless of camera optics and focus distance but varies in detailed characteristics such as gradient values and peak width. A common, general, characteristic is that the sharpness is low for close objects (corresponding to low distance) and increases with increasing distance until the sharpness reaches a maximum (max at 44 in the example of FIG. 4) after which the sharpness decreases with increasing distance, as indicated by 42. How fast and how much the sharpness increases, and decreases, are examples of detailed characteristics that may vary between optics with, e.g., different apertures or different sensor sizes, and may vary for different focus distances.

The embodiments utilize an optics-specific relationship which, in general, has the single sharpness maximum. By identifying an image part in the camera view 14, for the camera 10, that has a sharpness corresponding to the sharpness maximum of the optics-specific relationship 40, this can be used as a reference to find the target tilt angle. The target tilt angle is defined as the tilt angle in which the camera acquires images with a sharpness in a lower part of the image that corresponds to a target sharpness. In a simple example, the method may aim at making full use of the available DoF. In this example, sharpness in the lower part of the image shall, when the camera is in the target tilt angle, be equal to an acceptable sharpness to the application (e.g. application for detecting motion or identifying objects may set different acceptable sharpness levels).

The acceptable sharpness may, in turn, be defined by, for example the monitoring purpose (detect/identify).

Adding a more complex example, the fraction may be determined also based on circumstances such as scene type and how high above the ground the camera is positioned. A desire to minimize the amount of sky in the scene, or to minimize the inclusion of area on a distance closer than the near limit, may be taken into consideration when determining the fraction. These circumstances, together with the optics specification and focus settings (such as focus distance), are known to the party (typically a manufacturer) who determines the fraction.

The fraction may be determined on camera type level, or even on camera unit level. The fraction may be determined during manufacturing of the camera 10, and stored in, e.g., a memory of the camera 10, a system including the camera 10, or in a (for the camera 10) remotely accessible location.

An important part of the disclosed tilt angle assistance is to provide a target signal that indicates the target tilt angle of the camera 10. The target tilt angle is defined as the tilt angle of the camera 10 in which a sharpness indicator of a lower part of the camera's 10 FoV equals the target sharpness indicator. As described above, the target sharpness indicator is determined as a predetermined fraction, e.g. 80% of an identified maximum sharpness indicator. By locating the camera 10 in a tilt angle for which a captured image includes a sharpness span, when measuring in an upward direction from the lower part of the image, from the target sharpness indicator to beyond the sharpness maximum the positioning of the FoV 12 is controlled to make use of the available DoF in a desired way. As an example, and in order to aim at a maximum utilization of the available DoF in the FoV, the acceptable sharpness may be set to half the value at the HFD (HFD/2) as indicated in FIG. 4, provided that the focus distance is set to the HFD. The fraction may, according to the example of FIG. 4 be about 70-75% of max. In other embodiments, other fractions may of course be applied. For a focus distance being other than the HFD distance, a fraction working for the HFD may be applied with satisfying results. Hence, for a variable focus camera, a predetermined fixed fraction can still be applied with satisfying result.

To find the sharpness maximum, the image part having a sharpness that corresponds to the sharpness maximum is identified by determining sharpness indicators for different parts of the camera view 14, and evaluate the sharpness indicators in relation to each other. The image parts are spaced in the vertical direction v. Since the determination of the target sharpness indicator is based on relative characteristics of the series of sharpness indicators, and not on their absolute values, the method is not sensitive to how the sharpness indicators are measured as long as it is performed in the same manner throughout the process of assisting tilt angle adjustment.

The series of sharpness indicators may be determined based on a single thermal image, or from a plurality of thermal images that are acquired at different tilt angles.

Figure 5A:
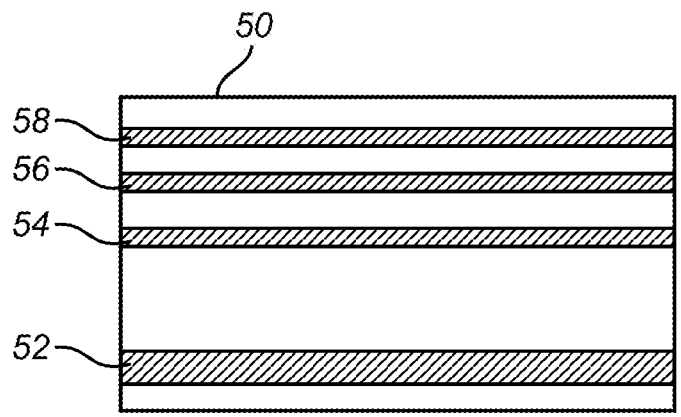
FIGS. 5A and 5B illustrate acquired images in which image parts are highlighted to illustrate an embodiment.
Figure 5B:
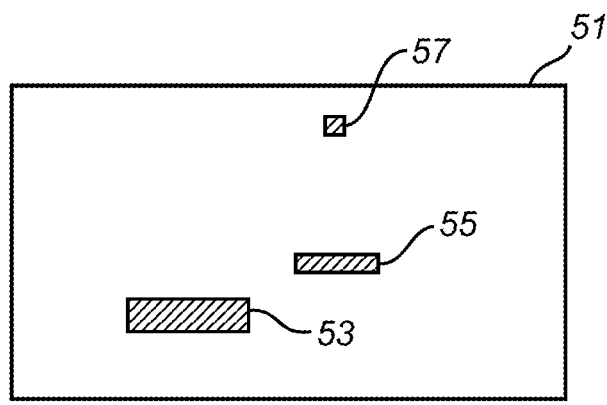

Going more into detail, a first embodiment where the series of sharpness indicators is determined based on a single thermal image will now be disclosed with reference to FIGS. 5A and 5B. A first thermal image 50 is illustrated with vertically spaced image parts 52, 54, 56, 58. Each image part 52, 54, 56, 58 extends horizontally over the whole image 50. From this image 50, a series of sharpness indicators is determined by determining one sharpness indicator for each image part 52, 54, 56, 58. The sharpness indicator is determined in the same way for each image part 52, 54, 56, 58. For example, the sharpness indicator may be determined by calculating a standard deviation or a variance of an edge measurement (calculated with one or a combination of edge algorithms such as a Sobel or Laplace edge algorithm) calculated for an image part covering a certain pixel area. In other words, the sharpness indicator may be obtained by applying a Sobel filter/Laplacian (or another edge detection tool) to every pixel in an image part and then taking the standard deviation over all those pixels. The pixel area may have a preselected size, e.g. 25×25 pixels, that is found suitable for a specific scene, application and/or camera optics.

A second thermal image 51 is illustrated having vertically spaced image parts 53, 55, 57. The image parts 53, 55, 57 have different widths, i.e. different horizontal lengths. It is also noted that image parts 53, 55, 57 are not aligned along the vertical direction. Hence, in order for the method to work, it is not necessary that the image parts, from which the series of sharpness indicators are determined, have equal size or are vertically aligned in some way. A series of sharpness indicators may be determined based on the image parts 53, 55, 57 in the same way as for the first thermal image 50.

When the series of sharpness indicators has been determined, the series is evaluated to see if it contains a significant maximum (which would correspond to the sharpness maximum, max, of the optics-specific relationship 40). By significant is meant that an identified maximum can be separated from natural variations within the series of sharpness indicators. If a significant maximum is identified, a predetermined fraction of that maximum is calculated, which is set as the target maximum indicator. There are many ways to determine a maximum in a series of values. For example, a mean value of a certain percentage, e.g. 5%, of the highest values in the series may represent the maximum of that series. Other readily available ways to determine a maximum exists and may be applied. Moreover, when determining the series of sharpness values based on a single image, a significant maximum may be determined by performing a curve fitting (which are well-known in the art) for the series of sharpness indicators.

Thereafter, and as explained above, a lower image part, of the first image 50 or the second image 51, is evaluated to determine which significant indicator it has. By lower image part may be meant a lower edge part that includes the lower edge pixels of the image. By lower image part may alternatively be meant a part located nearby the lower edge, for example the image part 52 of the first thermal image 50. The lower image part is preferably located on the lower 25%, as seen in the vertical direction, part of the image. The lower image part may extend horizontally along a part of the FoV, but preferably along the whole FoV width for improved accuracy for the sharpness indicator determination.

The vertical extension of the image parts 52, 54, 56 and the image parts 58, 53, 55, 57 should be chosen with care. It typically needs to be more than one pixel to lower the impact of single destructing pixels, e.g., dead pixels. On the other hand, the vertical extension should not be too many pixels since this would include a larger focus distance span which smears out the series of sharpness indicators along the optics-specific relationship making it more unlikely to be able to identify a significant maximum.

An appropriate balance (depending on, e.g., scene type, optics, and how far above a ground level the camera is positioned) between these factors are considered when choosing the form of image parts.

Upon concluding that the lower image part does not equal the target sharpness indicator, the thermal camera 10 needs to be tilted in order to be set in the target tilt angle. The tilting of the camera 10 may be performed manually, that is by a user (installer) that is moving the thermal camera 10 in a tilt direction by hand. The need for tilt may be indicated to the user by, e.g., a light or sound signal provided to the user. During tilting, the FoV is analysed, by capturing and analysing images, and in particular the same lower image part of the FoV is analysed to determine the sharpness indicator for the current FoV. When the sharpness indicator is equal to the target sharpness indicator, the thermal camera 10 indicates this to the user by a target signal. The target signal may be a sound or light signal, from a corresponding microphone or light source (e.g. an LED), of the camera 10. Alternatively, the target signal may be a data signal, for example representing a graphical indication as a part of an output image stream from the thermal camera. The image stream may be transmitted to, and displayed by, a mobile device such as a laptop, tablet, or smart phone, that may be used as an installation tool for other purposes as well. The target signal lets the user know that the camera 10 is positioned in the target tilt angle, and the camera 10 can in that way be guided to the target tilt angle without the need for advanced considerations or evaluations by the user.

Figure 6:
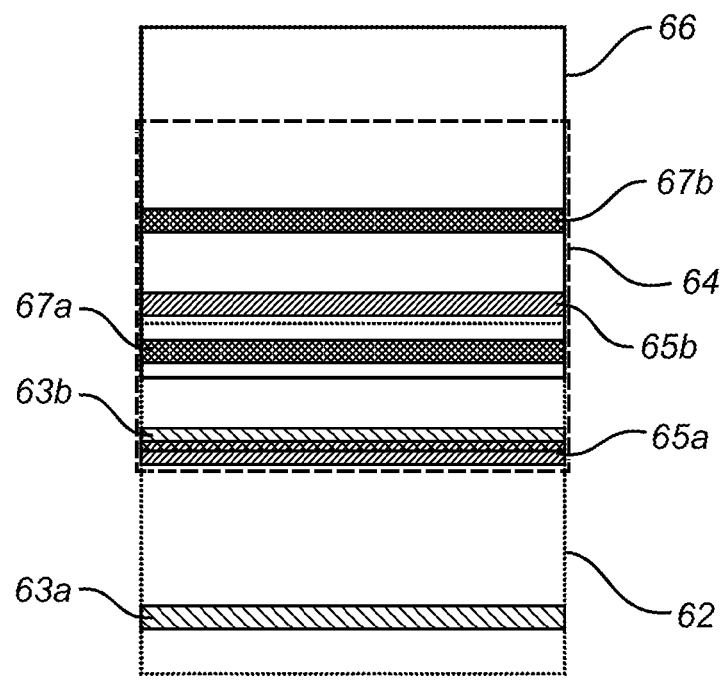
FIG. 6 illustrates overlapping acquired images acquired at different tilt angles of the thermal camera to illustrate an embodiment.

In a second embodiment, a series of sharpness indicators is determined based on a plurality of thermal images as will now be disclosed with reference to FIG. 6. In this specific example three images 62, 64, 66 are acquired while the thermal camera 10 is gradually tilted upwards, however the number of images is not limited to three. The number of images can be in the range of 2 to hundreds, but preferably somewhere in the range of 3-10.

In principle, only one sharpness indicator needs to be determined from each image 62, 64, 66, thus forming a series of sharpness indicators that can be evaluated in accordance with previously disclosed embodiments. In this example, however, each thermal image 62, 64, 66 forms a basis for two sharpness indicators. A first sharpness indicator is determined based on a vertically centered image part 63b, 65b, 67b of the images 62, 64, 66. The image part has essentially the same form and location for each determination. These sharpness indicators form a first series of sharpness indicators which is evaluated to identify its maximum in accordance with previously disclosed embodiments. The first series of sharpness indicators is preferably evaluated while acquiring images, in particular in the case of acquiring many (10+) images. A second series of sharpness indicators is also, preferably at the same time, formed by determining sharpness indicators from a lower image part 63a, 65a, 67a of the images 62, 64, 66. The second series of sharpness indicators is not necessarily analysed to find a maximum. However, when the maximum is identified in the first series of sharpness indicators, analysis of the second series of sharpness indicators is triggered. While the camera 10 continues to tilt upwards and additional images are acquired, the second series of sharpness indicators is enlarged with additional sharpness indicators and eventually should include the same maximum as identified in the first series of sharpness indicators. At the same time, the first series of sharpness indicators is also enlarged with additional sharpness indicators which should follow a decreasing trend beyond the maximum. Upon the maximum being identified in the second series of sharpness indicators, it may be evaluated if the first series of sharpness indicators follows the decreasing trend. If both these conditions, i.e. the maximum being identified in the second series and the decreasing trend being verified in the first series, the target sharpness indicator is calculated as a predetermined fraction of the maximum. For a camera 10 being manually tilted, a signal may at this point be provided to the user that the tilt direction should be shifted, meaning in this case that the camera 10 should be tilted downwards. In accordance with previously disclosed embodiments, the target tilt angle is thereafter eventually indicated to the user during tilting by evaluating a lower image part in the FoV based on the target sharpness indicator.

If the above discussed conditions of the first and second series of sharpness indicators are not fulfilled, an analysis of the series may continue until the conditions are fulfilled. If the camera 10 is tilted too fast, there may not be sufficient time to acquire images that are sufficiently close to each other within the camera view 14 for successfully performing the evaluation. In that case, a slow-down-signal may be provided by the thermal camera to the user to indicate that the camera 10 needs to be tilted slower. Such a feature further provides to a simple and user-friendly assistance during tilt adjustment.

In one embodiment, a combination of analysis of a single image, such as the ones in FIGS. 5A and 5B, and analysis of a plurality of images, such as the ones in FIG. 6, is performed. First, a single image is obtained and analyses for trying to find a maximum. Upon concluding that it is not possible to identify a significant maximum within the series of sharpness indicators, a plurality of images may be acquired during tilting of the camera 10. From the plurality of images, a maximum may be identified according to any disclosed embodiment.

In an alternative embodiment, tilting of the thermal camera 10 may be performed by a motor unit. The target signal can in this embodiment comprise an instruction to the motor unit to stop tilting when the target tilt angle is reached. The motor unit may be controlled to perform tilting for acquiring a plurality of images for evaluation in order to find the target sharpness indicator. The motor unit may be controlled by a processor of the camera or be controlled by a user located remotely and acting on instructions from the thermal camera.

Figure 7:
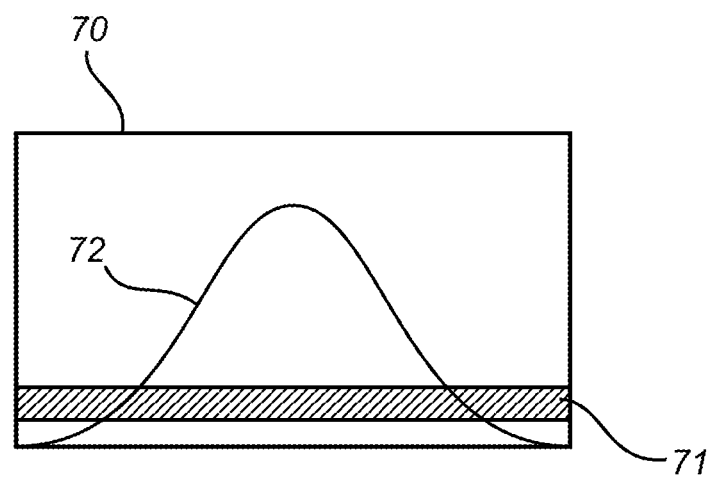
FIG. 7 illustrates a weighting function in conjunction with an acquired image.

In one embodiment, a weighting function is utilized in the calculation of sharpness indicators. FIG. 7 illustrates a weighting function 72 that is shown in conjunction with an example of a thermal image 70 with an image part 71 from which the sharpness indicator is determined. The weighting function 72 in this example indicated that horizontally centrally located pixels of the image part 71 has higher impact on the resulting sharpness indicator than horizontally peripheral areas. The weighting function 72 is herein chosen in this example to be a Gauss function, however other functions 72 may be selected depending on scene. The application of a weighting function 71 is particularly beneficial for perimeter surveillance, where typically a center area in the horizontal direction forms the region of interest in the FoV which is and interesting region to make best use of the available DoF in. Therefore, the tilt adjustment assistance, controlling the utilization of the DoF, should be based on image information in the center area. Going back to FIG. 3, that figure illustrates an embodiment that could gain from a weighting function which enhances the impact of pixels in a vertically extending zone covering the boundary defined by the fence 26, and which suppresses pixels in the surrounding, peripheral, area.

Figure 8:
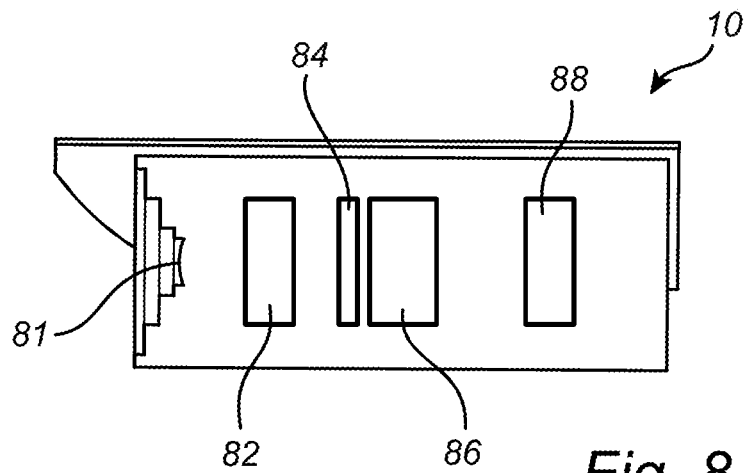
FIG. 8 illustrates components of the thermal camera according to an embodiment.

FIG. 8 illustrates components of the thermal camera 10 according to one embodiment. The thermal camera 10 comprises an image sensor 82 of a type that is well-known and commercially available. Also, optics 81, such as lenses, are included in the thermal camera 10. Further, an image processing unit 84 performs processing of image data acquired by the image sensor 82. The camera 10 also includes a processing unit 86 that is arranged to perform determine one or more series of sharpness indicators, identifying one or more maximums therein, determine a target sharpness indicator, and providing a target signal for indicating the target tilt angle. In the case of manual tilting, the camera 10 may comprise a signal generator (such as a sound or light indicator). The target signal may in that case be initiated by the processing unit 84 and be in the form of a sound or light to be perceived by the user. Alternatively, the processing unit 86 may be adapted to provide the target signal as data signal to be transmitted to an external device, such as a laptop, target, or smart phone. Optionally, the camera 10 includes a motor unit 88 that is coupled to a mechanical mount adapted for tilting of the camera 10. In this case, the processing unit 86 may be adapted to send signals in the form of instructions to the motor unit 86 for starting and stopping tilting in different directions during the tilt angle adjustment process.

Figure 9:
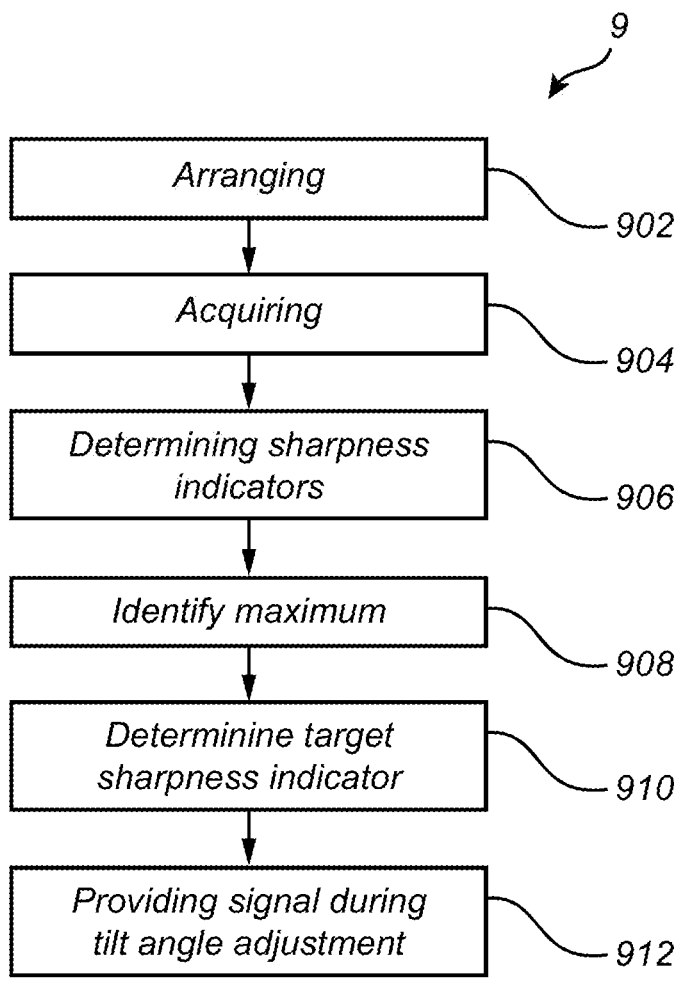
FIG. 9 illustrates a method of assisting tilt angle adjustment according to an embodiment.

FIG. 9 summarizes features that are common for the tilt angle adjustment assistance that have been disclosed by a plurality of non-limiting examples above. First, a thermal camera is arranged 902 at an initial tilt angle. This can be done manually or by use of a motor unit. Next, one or a plurality of thermal images are acquired 904. Next, at least one series of sharpness indicators are determined 906 from the acquired one or more images. Next, a maximum is identified 908 in one or more determined series of sharpness indicators. Optionally, a decreasing trend in one or more series of sharpness indicators is identified. Next, a target sharpness indicator is determined 910 as a predetermined fraction of the maximum. Finally, a target signal is provided 912 during tilt angle adjustment. The target signal is provided to be perceivable by a user, in the case of manual tilting, or as instructions to the motor unit, in the case of motorized tilting.

It will be appreciated that a person skilled in the art can modify the above-described embodiments in many ways and still use the advantages of the embodiments above. For example, other types of sharpness indicators may be used for the determination of the series of sharpness values. Also, the type of target signal may be varied outside the provided non-limiting examples of target signals. Thus, the teachings should not be limited to the shown embodiments but should only be defined by the appended claims. Additionally, as the skilled person understands, the shown embodiments may be combined.

The invention claimed is:

1. A method of assisting tilt angle adjustment of a thermal camera that is tiltably mounted for monitoring a scene at an angle from an elevated position, the method comprising:
    arranging the thermal camera at an initial tilt angle;
    acquiring at least one thermal image by the thermal camera;
    determining, from the at least one thermal image, a series of sharpness indicators of image parts corresponding to vertically spaced parts of the camera view;
    identifying a maximum in the series of sharpness indicators;
    based on the identified maximum, determining a target sharpness indicator as a predetermined fraction of the identified maximum; and
    during tilt angle adjustment, assisting by providing a target signal for indicating a target tilt angle of the thermal camera in which a sharpness indicator of a lower part of the camera's field of view equals the determined target sharpness indicator.

2. The method according to claim 1, wherein a single thermal image is acquired.

3. The method according to claim 2, wherein the method further comprises:
    evaluating if it is possible to identify the maximum from the series of sharpness indicator determined based on the single thermal image; and
    upon concluding that it is possible, identifying the maximum and determining the target sharpness indicator based on the identified maximum,
    upon concluding that it is not possible;
        acquiring further thermal images for which the thermal camera is arranged in different tilt angles;
        determining, from the further thermal images, further sharpness indicators of image parts corresponding to vertically spaced parts of the camera view, and add the further sharpness indicators to the series of sharpness indicators; and identifying the maximum and determining the target sharpness indicator based on the identified maximum.

4. The method according to claim 1, wherein a plurality of thermal images is acquired for which the thermal camera is arranged in different tilt angles at which a different thermal image is acquired, and wherein the series of sharpness indicators is determined from the plurality of the acquired thermal images.

5. The method according to claim 3, further comprising providing an instruction signal to a user for indicating that the tilt angle of the thermal camera should be changed for enabling acquisition of thermal images in different tilt angles.

6. The method according claim 1, wherein the target signal is provided to a user.

7. The method according to claim 6, wherein the target signal comprises a sound signal or a light signal that is provided to the user when the thermal camera is positioned in the target tilt angle.

8. The method according to claim 1, wherein the series of sharpness indicator is determined based on a weighting function applied to pixels in the image parts, and wherein the weighting function is selected such that pixels located, as seen in a horizontal direction, in a center area have more impact than pixels located in peripheral areas.

9. The method according to claim 1, wherein each sharpness indicator is determined by an algorithm based on edge detection, Laplace transform, or a modular transfer function.

10. The method according to claim 4, further comprising providing an instruction signal to a user for indicating that the tilt angle of the thermal camera should be changed for enabling acquisition of thermal images in different tilt angles.

11. A thermal camera adapted to be tiltably mounted for monitoring a scene at an angle from an elevated position, the thermal camera comprising:
   an image capturing unit arranged to acquire at least one thermal image;
   a processing unit arranged to:
      determine, from the at least one thermal image, a series of sharpness indicators of image parts corresponding to vertically spaced parts of the camera view;
      identify a maximum in the series of sharpness indicators;
      based on the identified maximum, determine a target sharpness indicator as a predetermined fraction of the identified maximum; and
      during tilt angle adjustment, assist by providing a target signal for indicating a target tilt angle of the thermal camera in which a sharpness indicator of a lower part of the camera's field of view equals the determined target sharpness indicator.

12. The thermal camera according to claim 11, further comprising a sound or light indicator arranged to provide the target signal in the form of a sound or light signal that is hearable or visible to a user, and wherein the processing unit is arranged to instruct the sound or light indicator to transmit the target signal when the thermal camera is positioned in the target tilt angle.

13. The thermal camera according to claim 11, further comprising a motor unit arranged to tilt the thermal camera, wherein the processing unit is further arranged to instruct the motor unit to tilt the thermal camera for acquiring a plurality of thermal images for which the thermal camera is arranged in different tilt angles.

14. The thermal camera according to claim 13, wherein the processing unit is arranged to provide the target signal in the form of an instruction to the motor unit to stop tilting.

15. The thermal camera according to claim 11, wherein the thermal camera is a fixed focus thermal camera.

16. A method of providing perimeter surveillance comprising:
   arranging a thermal camera at an initial tilt angle;
   acquiring at least one thermal image by the thermal camera;
   determining, from the at least one thermal image, a series of sharpness indicators of image parts corresponding to vertically spaced parts of the camera view;
   identifying a maximum in the series of sharpness indicators;
   based on the identified maximum, determining a target sharpness indicator as a predetermined fraction of the identified maximum; and
   performing tilt angle adjustment, by providing a target signal for indicating a target tilt angle of the thermal camera in which a sharpness indicator of a lower part of the camera's field of view equals the determined target sharpness indicator.

* * * * *